United States Patent
Kim et al.

(10) Patent No.: US 9,660,233 B2
(45) Date of Patent: May 23, 2017

(54) BASE PLATE OF BATTERY MODULE ASSEMBLY WITH NOVEL STRUCTURE

(71) Applicant: LG CHEM, LTD., Seoul (KR)

(72) Inventors: Juhan Kim, Daejeon (KR); Bum Hyun Lee, Daejeon (KR); Jun Yeob Seong, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 79 days.

(21) Appl. No.: 14/762,058

(22) PCT Filed: May 15, 2013

(86) PCT No.: PCT/KR2013/004294
§ 371 (c)(1),
(2) Date: Jul. 20, 2015

(87) PCT Pub. No.: WO2014/185568
PCT Pub. Date: Nov. 20, 2014

(65) Prior Publication Data
US 2016/0156004 A1  Jun. 2, 2016

(51) Int. Cl.
*H01M 2/16* (2006.01)
*H01M 2/10* (2006.01)
*H01M 10/04* (2006.01)

(52) U.S. Cl.
CPC ....... *H01M 2/1061* (2013.01); *H01M 2/1077* (2013.01); *H01M 10/0413* (2013.01); *H01M 10/0472* (2013.01); *H01M 2220/10* (2013.01)

(58) Field of Classification Search
CPC ......... H01M 10/0413; H01M 10/0472; H01M 2220/10; H01M 2/1061; H01M 2/1077
See application file for complete search history.

(56) References Cited

U.S. PATENT DOCUMENTS

| | | |
|---|---|---|
| 6,230,834 B1 | 5/2001 | Van Hout et al. |
| 6,521,371 B1 | 2/2003 | Lavanture |
| 2007/0141457 A1 | 6/2007 | Amagai |
| 2008/0138698 A1 | 6/2008 | Ogami et al. |
| 2011/0014512 A1 | 1/2011 | Amagai et al. |
| 2013/0177793 A1 | 7/2013 | Seki |

(Continued)

FOREIGN PATENT DOCUMENTS

| | | | | |
|---|---|---|---|---|
| JP | 2011-100619 | * | 5/2011 | ............ H01M 2/10 |
| JP | 2011-100619 A | | 5/2011 | |

(Continued)

OTHER PUBLICATIONS

International Search Report issued in PCT/KR2013/004294, mailed on Feb. 24, 2014.

*Primary Examiner* — Patrick Ryan
*Assistant Examiner* — Ben Lewis
(74) *Attorney, Agent, or Firm* — Birch, Stewart, Kolasch & Birch, LLP

(57) ABSTRACT

Disclosed herein is a base plate of a battery module assembly, wherein the base plate is made of a metal sheet having module receiving parts, on which one or more battery modules each including battery cells are loaded, formed at a top thereof, the sheet is provided at at least a portion of an outer edge thereof with upwardly bent side walls, and the module receiving parts are provided with reinforcement beads protruding toward the battery modules.

23 Claims, 12 Drawing Sheets

(56) References Cited

U.S. PATENT DOCUMENTS

2013/0236761 A1 9/2013 Seong et al.
2014/0141298 A1 5/2014 Michelitsch

FOREIGN PATENT DOCUMENTS

| JP | 4858660 B1 | 1/2012 |
| KR | 10-2009-0000307 A | 1/2009 |
| KR | 10-2013-0042430 A | 4/2013 |
| WO | WO 2012/070783 A2 | 5/2012 |
| WO | WO 2012/158150 A1 | 11/2012 |
| WO | WO 2013/000828 A1 | 1/2013 |

* cited by examiner

BASE PLATE OF BATTERY MODULE ASSEMBLY WITH NOVEL STRUCTURE

TECHNICAL FIELD

The present invention relates to a base plate of a battery module assembly having a novel structure, and more particularly to a base plate of a battery module assembly, wherein the base plate is made of a metal sheet having module receiving parts, on which one or more battery modules each including battery cells are loaded, formed at a top thereof, the sheet is provided at at least a portion of an outer edge thereof with upwardly bent side walls, and the module receiving parts are provided with reinforcement beads protruding toward the battery modules.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

In addition, the secondary batteries have attracted considerable attention as an energy source for electric vehicles and hybrid electric vehicles, which have been developed to solve problems, such as air pollution, caused by existing gasoline and diesel vehicles using fossil fuel. As a result, the secondary batteries are being applied to an increasing number of applications owing to advantages thereof, and, in the future, the secondary batteries are expected to be applied to even more applications and products.

As applications and products, to which the secondary batteries are applicable, are increased, kinds of batteries are also increased such that the batteries can provide outputs and capacities corresponding to the various applications and products. In addition, there is a strong need to reduce the size and weight of the batteries applied to the corresponding applications and products.

For example, small-sized mobile devices, such as mobile phones, personal digital assistants (PDA), digital cameras, and laptop computers, use one or several small-sized, lightweight battery cells for each device according to the reduction in size and weight of the corresponding products. On the other hand, middle or large-sized devices, such as electric bicycles and hybrid electric vehicles, use a battery module (which may also be referred to as a "middle or large-sized battery pack") having a plurality of battery cells electrically connected with each other because high output and large capacity are necessary for the middle or large-sized devices. The size and weight of the battery module is directly related to an accommodation space and power of the corresponding middle or large-sized device. For this reason, manufacturers are trying to manufacture small-sized, lightweight battery modules.

Meanwhile, in a conventional battery module, a secondary battery may be abnormally operated due to overcharge, overdischarge, overheating, external impact, etc. with the result that gas may be generated in the battery. For example, the overheated battery generates gas, and decomposition of battery components is further accelerated as the gas is pressurized in a battery case, which causes continuous overheating and generation of gas with the result that a swelling phenomenon may occur. This phenomenon also occurs when the secondary battery is slowly deteriorated due to use of the secondary battery for a long time. In a case in which the battery module is configured to have a structure in which the battery module directly contacts the outer surface of a battery pack, the outer surface of the battery pack may be deformed due to swelling.

In order to solve the above problem, an additional structure is further fixed to the outermost side of the conventional battery module to minimize swelling. In this case, however, the overall volume of a battery module assembly is increased, and a production process is complicated.

Therefore, there is a high necessity for technology that is capable of fundamentally solving the above problems.

DISCLOSURE

Technical Problem

The present invention has been made to solve the above problems and other technical problems that have yet to be resolved.

Therefore, it is an object of the present invention to provide a base plate of a battery module assembly configured to have a specific structure including a reinforcement bead, whereby it is possible to restrain the increase in volume of the battery module assembly while preventing deformation of the battery module assembly due to swelling and to improve efficiency of a production process.

It is another object of the present invention to provide a battery module assembly which can be assembled to have a compact structure, in which members received in the battery module assembly are stably fixed, thereby simultaneously improving safety and efficiency of the production process.

Technical Solution

In accordance with one aspect of the present invention, the above and other objects can be accomplished by the provision of a base plate of a battery module assembly, wherein the base plate is made of a metal sheet having module receiving parts, on which one or more battery modules each including battery cells are loaded, formed at a top thereof, the sheet is provided at at least a portion of an outer edge thereof with upwardly bent side walls, and the module receiving parts are provided with reinforcement beads protruding toward the battery modules.

The base plate of the battery module assembly according to the present invention includes the reinforcement beads. Consequently, it is possible to prevent deformation of outer surfaces of the battery modules due to swelling without the provision of an additional support structure. In addition, it is possible to configure the battery module assembly such that the battery module assembly has a compact structure.

In a preferred example, each of the battery cells may be a prismatic secondary battery or a pouch-shaped secondary battery. However, the present invention is not limited thereto.

The prismatic secondary battery may be configured to have a structure in which an electrode assembly is mounted in a prismatic metal case in a sealed state, and the pouch-shaped secondary battery may be configured to have a structure in which an electrode assembly is mounted in a laminate sheet including a resin layer and a metal layer in a sealed state.

The secondary battery may be a lithium secondary battery exhibiting high energy density, discharge voltage, and output stability. Other components of the lithium secondary battery will hereinafter be described in brief.

In general, the lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed. On the other hand, the negative electrode may be manufactured by applying a mixture of a negative electrode active material and a binder to a negative electrode current collector and drying the mixture. The above-mentioned ingredients may be further included as needed.

The separator is disposed between the negative electrode and the positive electrode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains, and therefore a detailed description thereof will be omitted.

The lithium secondary battery may be manufactured using an ordinary method well known in the art to which the present invention pertains. That is, the lithium secondary battery may be manufactured by disposing a porous separator between a positive electrode and a negative electrode and injecting an electrolytic solution thereinto.

The positive electrode may be manufactured, for example, by applying a slurry containing a lithium transition metal oxide active material, a conductive material, and a binder to a current collector and drying the applied slurry. In the same manner, the negative electrode may be manufactured, for example, by applying a slurry containing a carbon active material, a conductive material, and a binder to a thin current collector and drying the applied slurry.

In a preferred example, each of the battery modules may be configured such that the battery cells are connected in parallel to each other.

In a concrete example, the parallel connection between the battery cells may be achieved using a '¬'-shaped or '['-shaped bus bar. Alternatively, electrode terminals of the battery cells may be directly connected to each other using the bus bar.

The battery cells may be fixed to a cartridge frame, and each of the battery modules may be configured to have a structure in which cartridge frames are stacked.

The cartridge frame is a structure exhibiting predetermined rigidity. The cartridge frame protects the battery cells from external impact and secures stable mounting of the battery cells. In addition, the battery cells are arranged such that electrode leads of the battery cells are directed to one side by the cartridge frame. Consequently, it is possible to more easily achieve electrical parallel connection between the battery cells via the bus bar.

In addition, the electrode leads of the battery cells electrically connected in parallel to each other via the bus bar may be connected to electrode terminals, and the electrode terminals may be disposed at the same side as the side at which the electrode leads are arranged. Consequently, a battery module, configured to have a structure in which battery cells are fixed to a cartridge frame, and cartridge frames are stacked, may be electrically connected to another battery module via electrode terminals formed at one side of each of the battery modules. In addition, a detection member for voltage detection may be easily mounted at each battery module.

For example, the sheet may be a metal sheet.

In a preferred example, two or more battery modules may be loaded on the base plate, and the battery module assembly may include a plate-shaped assembly cover loaded on tops of the battery modules and coupled to the battery modules in a fastening fashion, the assembly cover including a cable fixing part for fixing a cable.

The battery modules may be stably mounted and fixed to the module receiving parts of the base plate by the provision of the assembly cover. In addition, the overall rigidity of the battery module assembly may be increased, and cables received in the base plate may be stably fastened and fixed.

In the above structure, the battery modules may be provided with fastening holes for fastening with the assembly cover. Consequently, the battery modules may be loaded on the tops of the module receiving parts formed at the base plate and, at the same time, fastened to the assembly cover, thereby achieving more secure and stable fixing. In addition, fastening between the battery modules and the assembly cover through the fastening holes may be achieved using bolts or rivets. However, the present invention is not limited thereto.

Meanwhile, each of the reinforcement beads may have a protruding height equivalent to 10 to 400% the thickness of the base plate. In a case in which the height is too small, it is difficult to exhibit effects obtained by forming the reinforcement beads, which is not preferable. In a case in which the height is too large, on the other hand, overall volume of the battery module assembly is increased, which is also not preferable. Preferably, each of the reinforcement beads has a protruding height equivalent to 30 to 300% the thickness of the base plate.

In another preferred example, each of the reinforcement beads may include a main bead located at a center of a corresponding one of the module receiving parts for absorbing expansion stress concentrated on the center of a corresponding one of the battery modules, the main bead being circular when viewed from above, auxiliary beads located at corners of a corresponding one of the module receiving parts, each of the auxiliary beads having a smaller size than the main bead, each of the auxiliary beads being circular when viewed from above, and connection beads extending from the main bead to the respective auxiliary beads.

Consequently, the main bead absorbs overall stress concentrated on a corresponding one of the battery modules, and the connection beads and the auxiliary beads dissipate the stress in every direction, which is very preferable.

In the above structure, the main bead may have a radius greater than that of each of the auxiliary beads so as to effectively absorb expansion stress from the battery cells or a corresponding one of the battery modules. For example, the main bead may have a radius equivalent to 1.5 to 10 times that of each of the auxiliary beads.

In accordance with another aspect of the present invention, there is provided a battery module assembly including the base plate with the above-stated construction.

The battery module assembly may further include two or more battery modules, each of which includes two or more plate-shaped battery cells vertically stacked such that electrode leads of the battery cells are arranged in one direction, and an upper cover plate including downwardly bent side walls formed at opposite sides thereof on the basis of electrode terminals of the battery modules, the upper cover plate being fixed on the base plate to form a top of the battery module assembly.

That is, it is possible to stably fix the battery modules and to easily fix components, such as the upper cover plate, thereby improving safety and efficiency of a production process.

In a concrete example, the upper cover plate may also be provided with a reinforcement bead protruding toward the battery modules.

Specifically, the reinforcement bead of the upper cover plate may be formed to have an X shape when viewed from above so as to improve rigidity of the upper cover plate. Consequently, it is possible to effectively prevent deformation of the battery module assembly by means of the reinforcement beads of the base plate and the upper cover plate, which are located at outermost sides of the battery module assembly without the provision of an additional support structure.

In another concrete example, each of the battery modules may further include an electrically insulative module cover mounted on the electrode leads of the battery cells and fixed to the base plate and an assembly cover in a fastening fashion.

Consequently, the module cover protects the electrode leads of the battery cells from external impact. In addition, the module cover electrically isolates the battery module assembly from the outside since the module cover is made of an electrically insulative material.

The module cover may include a first hook for fixing cables connected to the electrode terminals of each of the battery modules, an upward protrusion for positioning fixedly engaged with the assembly cover, and a second hook mounted and fixed to each of the battery modules.

Specifically, the first hook includes one or more protruding parts for holding and fixing cable terminals and cables. When the cable terminals and the cables are electrically connected to each other, therefore, it is possible to prevent release of the connections between the cable terminals and the cables from the battery module assembly or rotation of the cable terminals. In addition, it is possible to more rapidly assemble the battery modules in a process of assembling the battery module assembly and to secure a safer production process.

Furthermore, it is possible to more rapidly perform a process of assembling the battery modules since the module cover includes the second hook that can be easily mounted to and separated from each of the battery modules. In addition, the module cover is made of a material exhibiting predetermined rigidity. Consequently, it is possible for the module cover to integrate the plate-shaped battery cells stacked in each of the battery modules and, at the same time, to protect each of the battery modules from external impact. Furthermore, the battery module integrated by the module cover may be integrated with the assembly cover since the module cover includes the upward protrusion that can be fixed to a predetermined position of the assembly cover.

The module cover may further include a bushing insertion hole, through which the module cover is mounted and fixed to the base plate.

Specifically, the module cover may further include a bushing insertion hole, through which the module cover is fastened and fixed to the upper cover plate and the base plate. The module cover is fastened and fixed to the upper cover plate and the base plate by a bushing inserted into the bushing insertion hole and fastening members. The fastening members may be bolts. However, the present invention is not limited thereto.

Consequently, the battery module integrated with the module cover is stably mounted and fixed to the base plate through the bushing insertion hole, and therefore, the battery module assembly may exhibit stable and desired rigidity.

In a preferred example, the base plate and the upper cover plate may be fixed to each other via brackets.

Specifically, each of the brackets may have one side coupled to a corresponding side wall of the base plate in a welding fashion and the other side coupled to a corresponding one of the side walls of the upper cover plate in fastening fashion.

Fastening between the upper cover plate and the brackets may be achieved using elastic deformation of the upper cover plate. To this end, protruding parts may be formed at the side walls of the upper cover plate, and depressed parts having sizes corresponding to the protruding parts may be formed at side walls of the brackets such that the protruding parts of the upper cover plate can be coupled into the depressed parts of the brackets in a fastening fashion.

The protruding parts may include fastening holes, and the depressed parts may include fastening holes corresponding to the fastening holes of the protruding parts such that fastening members can be inserted through the fastening holes of the protruding parts and the depressed parts to achieve fastening and fixing between the protruding parts and the depressed parts.

Consequently, the upper cover plate may be easily located at the brackets due to elasticity of the upper cover plate, thereby more easily performing a fastening assembly process.

In accordance with a further aspect of the present invention, there is provided a device including the battery module assembly with the above-stated construction as a power source. Specifically, the device may be a power supply for emergency, a power supply for computer rooms, a portable power supply, a power supply for medical facilities, a power supply for fire extinguishing facilities, a power supply for alarm facilities, or a power supply for refuge facilities. However, the present invention is not limited thereto.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
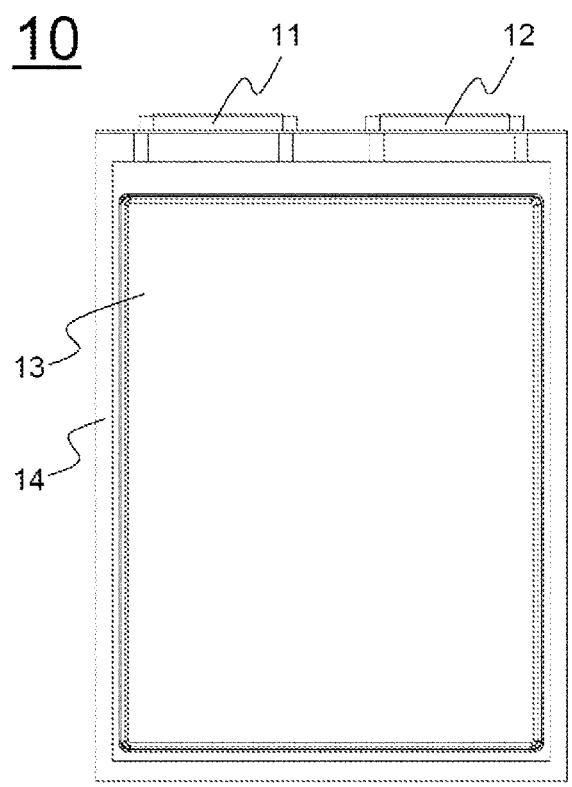
FIG. 1 is a plan view showing a pouch-shaped battery cell according to an embodiment of the present invention.

FIG. 1 is a plan view showing a plate-shaped battery cell 10 having electrode leads 11 and 12 formed at one end thereof.

Referring to FIG. 1, the battery cell 10 is a plate-shaped battery cell 10 having electrode leads 11 and 12 formed at one end thereof. Specifically, the plate-shaped battery cell 10 is configured to have a structure in which an electrode assembly (not shown) is mounted in a pouch-shaped battery case 13 made of a laminate sheet including a metal layer (not shown) and a resin layer (not shown). The plate-shaped battery cell 10 may be generally referred to as a pouch-shaped battery cell 10.

Figure 2:
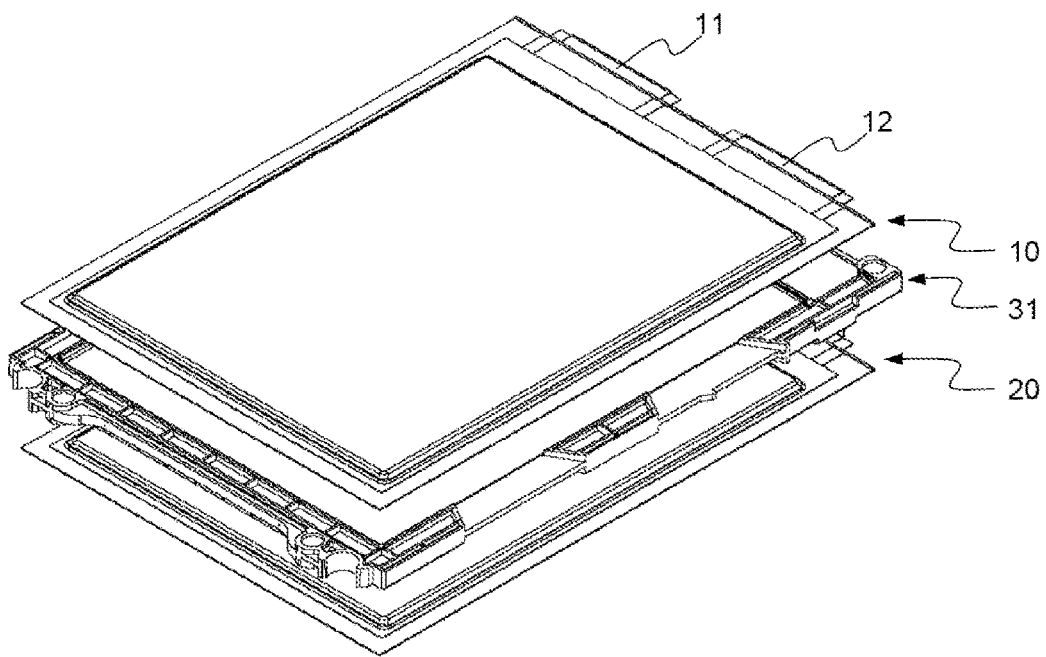
FIG. 2 is a perspective view showing that battery cells, one of which is shown in FIG. 1, are mounted at a cartridge frame.
Figure 3:
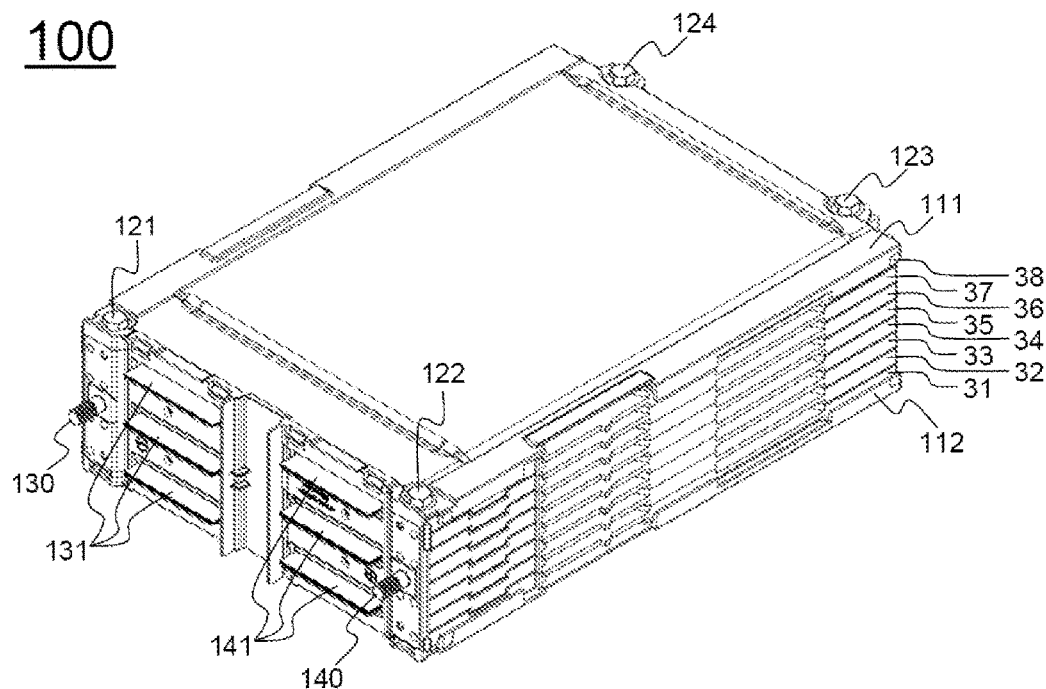
FIG. 3 is a perspective view showing a battery module assembled by stacked cartridge frames, one of which is shown in FIG. 2.

FIG. 2 is a perspective view showing that battery cells 10 and 20 are mounted at a cartridge frame 31, and FIG. 3 is a perspective view showing a battery module 100 assembled by cartridge frames 31 to 38.

Referring to these figures, the battery cells 10 and 20 are mounted at the cartridge frame 31, and the cartridge frames 31 to 38 are fixed to a cartridge frame upper end cover 111 and a cartridge frame lower end cover 112 by bolts 121, 122, 123, and 124 to constitute the battery module 100. In addition, the electrode leads 11 and 12 of the battery cells 10 and 20 mounted at the respective cartridge frames 31 to 38 are arranged at one side of the battery module 100 and are electrically connected in parallel to each other via '['-shaped bus bars 131 and 141. In addition, the electrode leads 11 and 12 electrically connected in parallel to each other are connected to a positive electrode terminal 130 and a negative electrode terminal 140, respectively.

Figure 4:
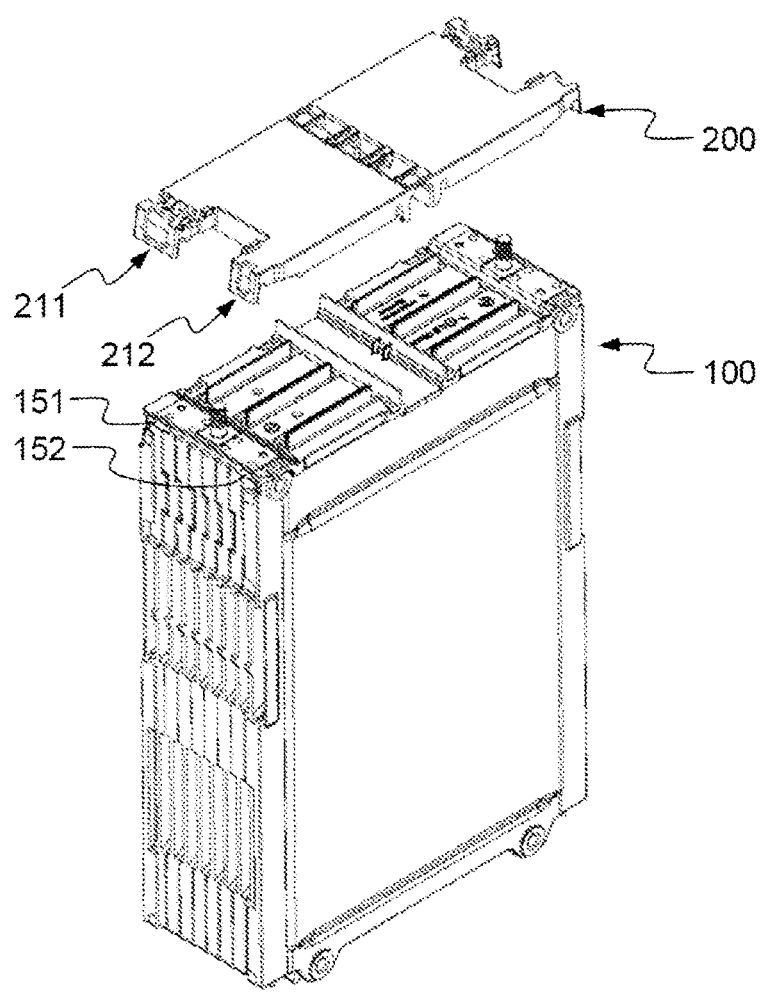
FIGS. 4 and 5 are perspective views showing that a module cover is mounted at the battery module of FIG. 3.
Figure 5:
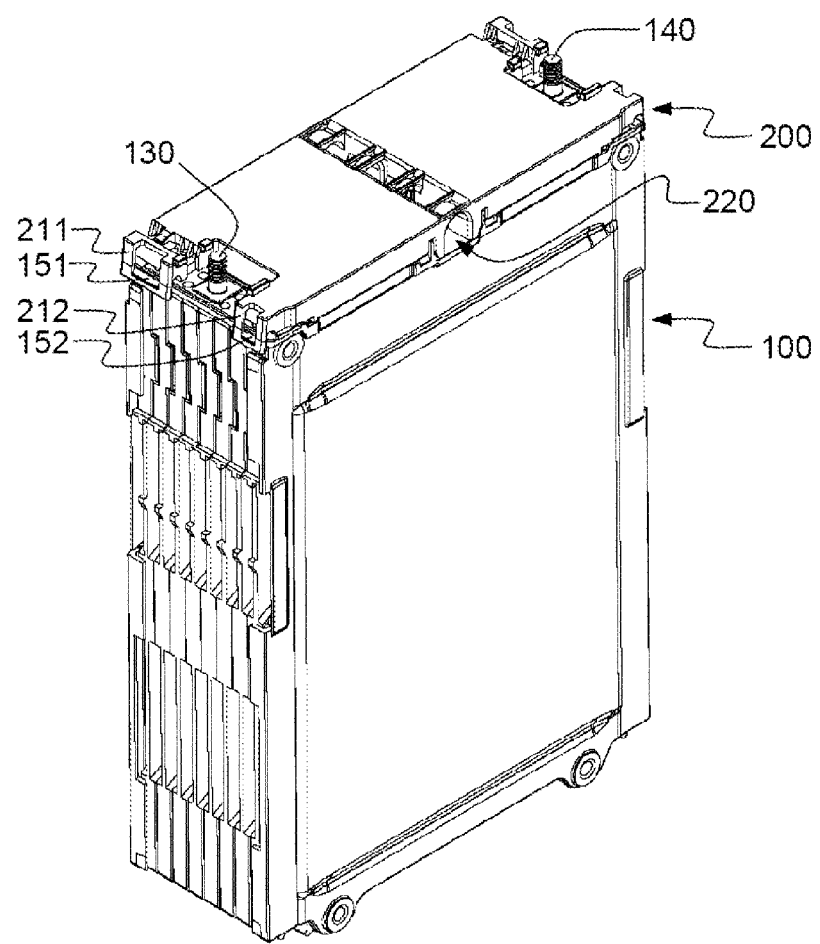
Figure 6:
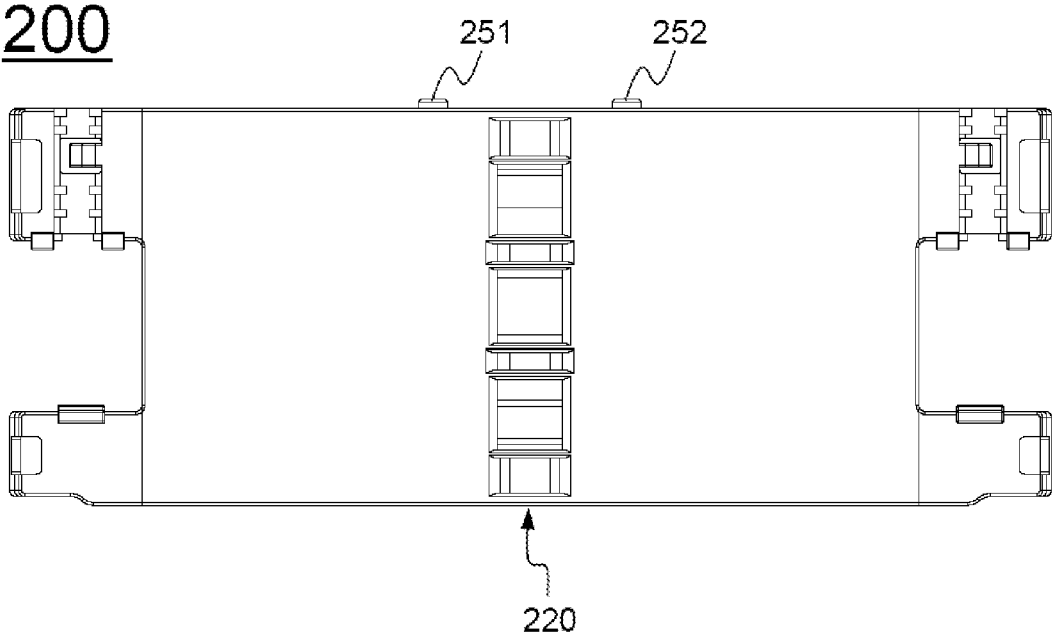
FIG. 6 is a front view showing a module cover according to an embodiment of the present invention.

FIGS. 4 and 5 are perspective views showing that a module cover 200 is mounted at the battery module 100 of FIG. 3, and FIG. 6 is a front view showing a module cover 200 according to an embodiment of the present invention.

Referring to these figures, protruding parts 151 and 152 each having a hook structure are formed at each edge of one side of the battery module at which the module cover 200 is mounted. In addition, the module cover 200 is provided with second hooks 211 and 212 corresponding to the protruding parts 151 and 152.

In the hook structure, engagement and disengagement are very easily performed. In an assembly process of the battery module 100, therefore, work efficiency is improved.

Figure 11:
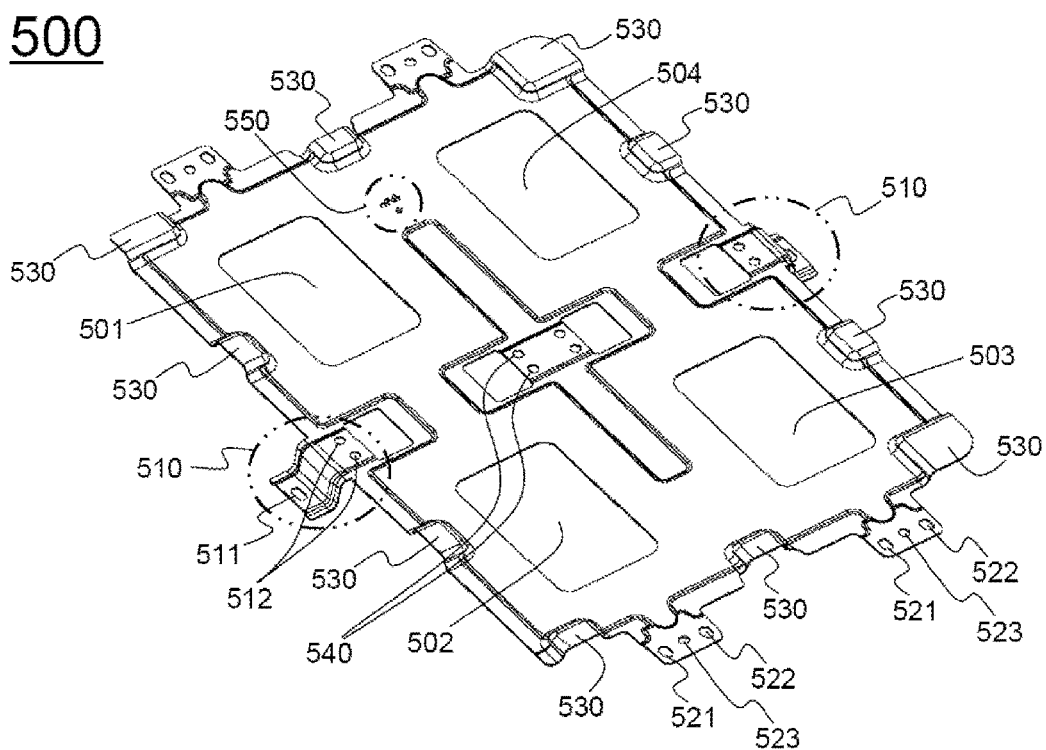
FIG. 11 is a perspective view showing an assembly cover according to an embodiment of the present invention.

FIG. 11 is a perspective view showing an assembly cover according to an embodiment of the present invention.

Referring to FIG. 6 together with FIG. 11, the module cover 200 includes upward protrusions 251 and 252 for positioning fixed to an assembly cover 500 by engagement therebetween. In addition, the module cover 200 includes a bushing insertion hole 220, and the module cover 200 is more securely fixed to the battery module 100 through fastening holes 523 of the assembly cover 500.

Figure 7:
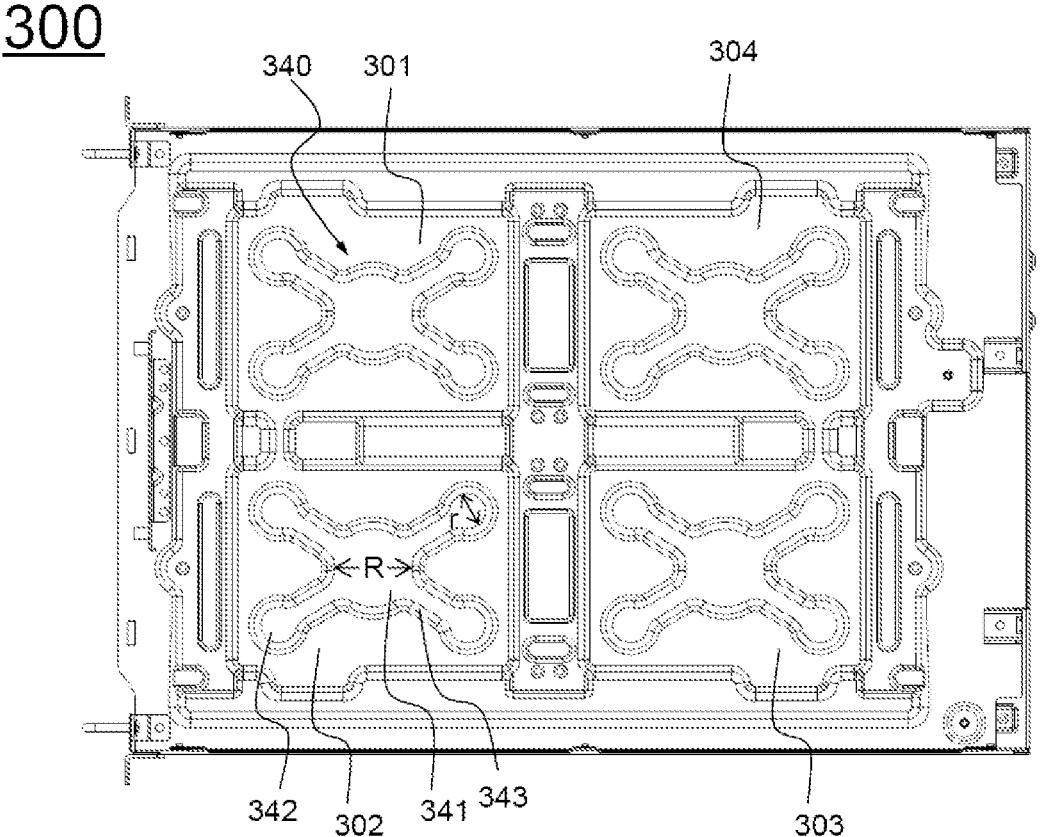
FIG. 7 is a front view showing a base plate according to an embodiment of the present invention.
Figure 8:
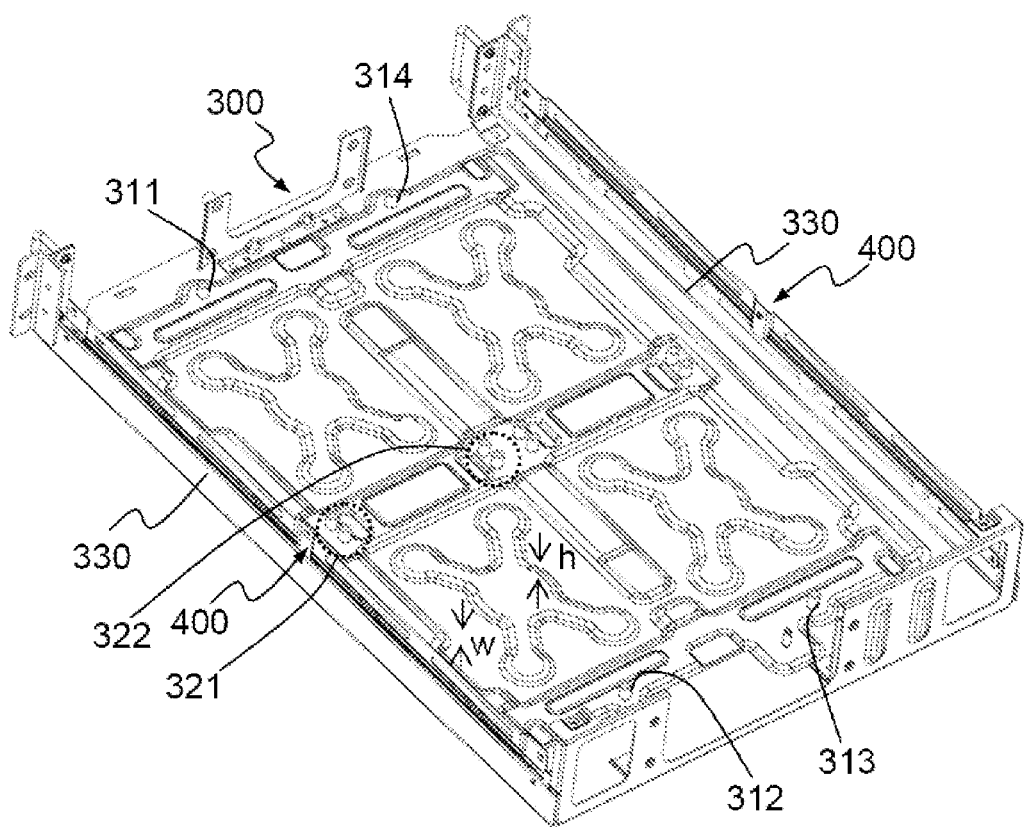
FIG. 8 is a perspective view showing that brackets are mounted at the base plate of FIG. 7.
Figure 9:
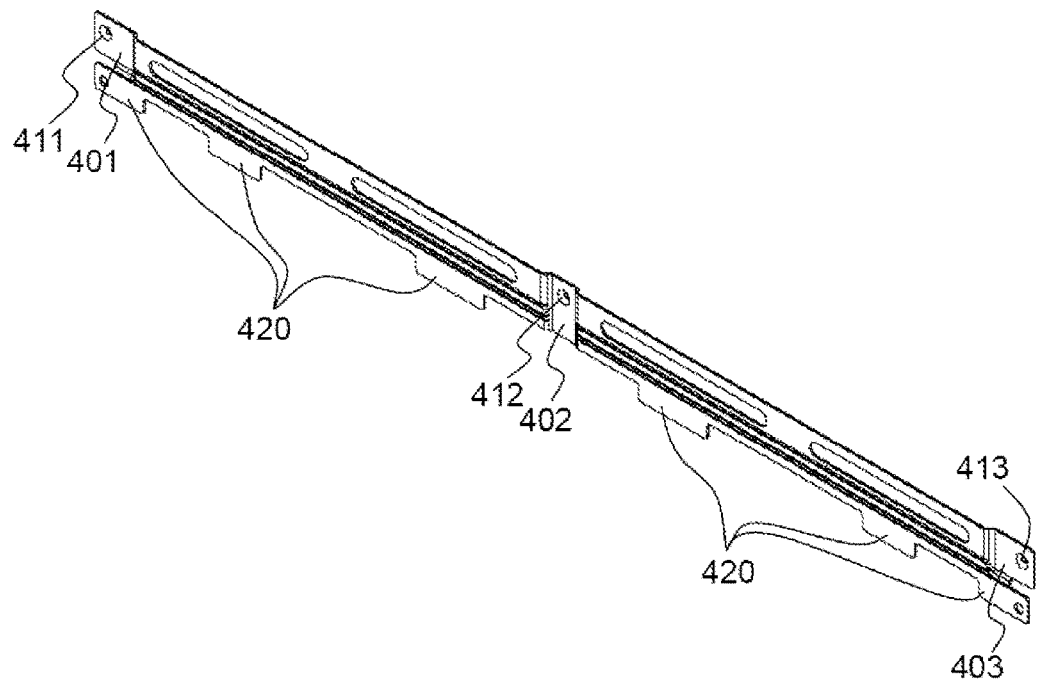
FIG. 9 is a perspective view showing a bracket according to an embodiment of the present invention.

FIG. 7 is a front view showing a base plate according to an embodiment of the present invention, FIG. 8 is a perspective view showing that brackets 400 are mounted at the base plate 300 of FIG. 7, and FIG. 9 is a perspective view showing a bracket 400 according to an embodiment of the present invention.

Referring to these figures, the base plate 300 is made of a metal sheet having module receiving parts 301, 302, 303, and 304, on which battery modules (not shown) are loaded, formed at the top thereof. Upwardly bent side walls 330 are formed at at least a portion of the outer edge of the metal sheet, i.e. at opposite side edges of the metal sheet. The module receiving parts 301, 302, 303, and 304 are provided with reinforcement beads 340 protruding toward the battery modules.

Specifically, each of the reinforcement beads 340 includes a main bead 341 located at the center of a corresponding one of the module receiving parts 301, 302, 303, and 304 for absorbing expansion stress concentrated on the center of a corresponding one of the battery modules, the main bead 314 being circular when viewed from above, auxiliary beads 342 located at corners of a corresponding one of the module receiving parts 301, 302, 303, and 304, each of the auxiliary beads 342 having a smaller size than the main bead 314, each of the auxiliary beads 342 being circular when viewed from above, and connection beads 343 extending from the main bead 314 to the respective auxiliary beads 342.

Each of the reinforcement beads 340 has a protruding height equivalent to about 150% a thickness W of the base plate 300, and the main bead 314 has a radius R equivalent to about four times a radius r of each of the auxiliary beads 342. Consequently, the main beads 314 absorbs overall expansion stress concentrated on a corresponding one of the battery modules in cooperation with the connection beads 343 and the auxiliary beads 342 while absorbing expansion stress concentrated on the center of a corresponding one of the battery modules.

Meanwhile, upwardly protruding fastening parts 311, 312, 313, and 314 are formed at the bottom of the base plate 300. In addition, the brackets 400 are connected to the upwardly bent side walls 330 formed at the outer edge of the base plate 300 by welding.

Each of the brackets 400 is provided with welding coupling parts 420 connected to a corresponding one of the side walls 330 of the base plate 300 by welding, depressed parts 401, 402, and 403 coupled to an upper cover plate (not shown) by fastening, and fastening holes 411, 412, and 413 formed at the respective depressed parts 401, 402, and 403.

Figure 10:
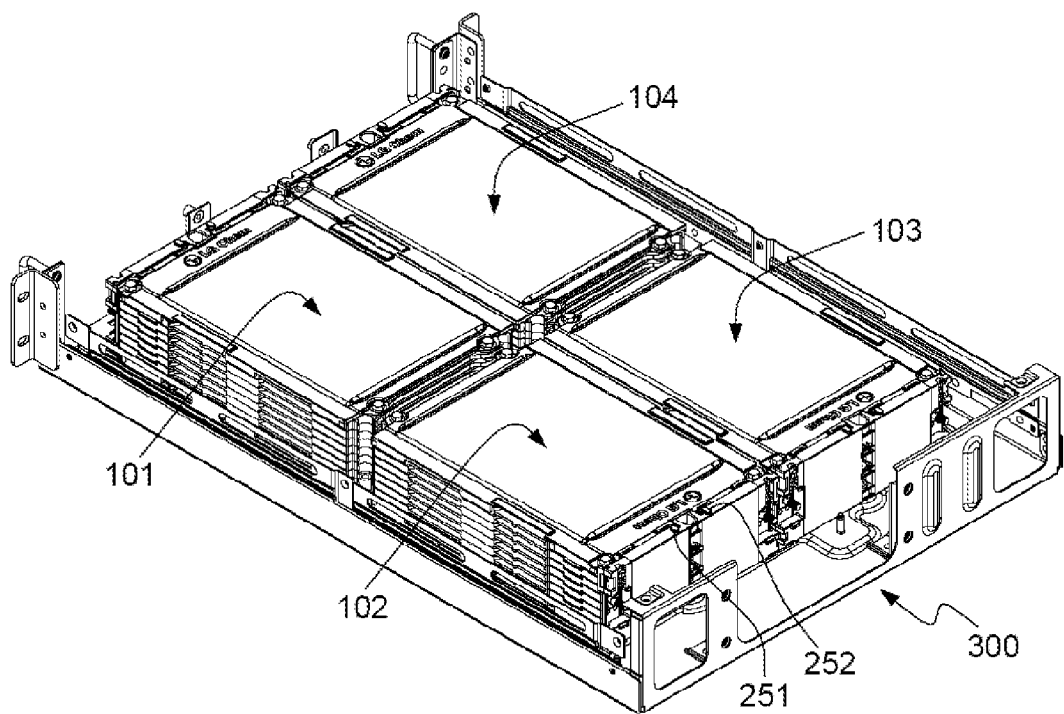
FIG. 10 is a perspective view showing that battery modules are located on the base plate of FIG. 7.
Figure 12:
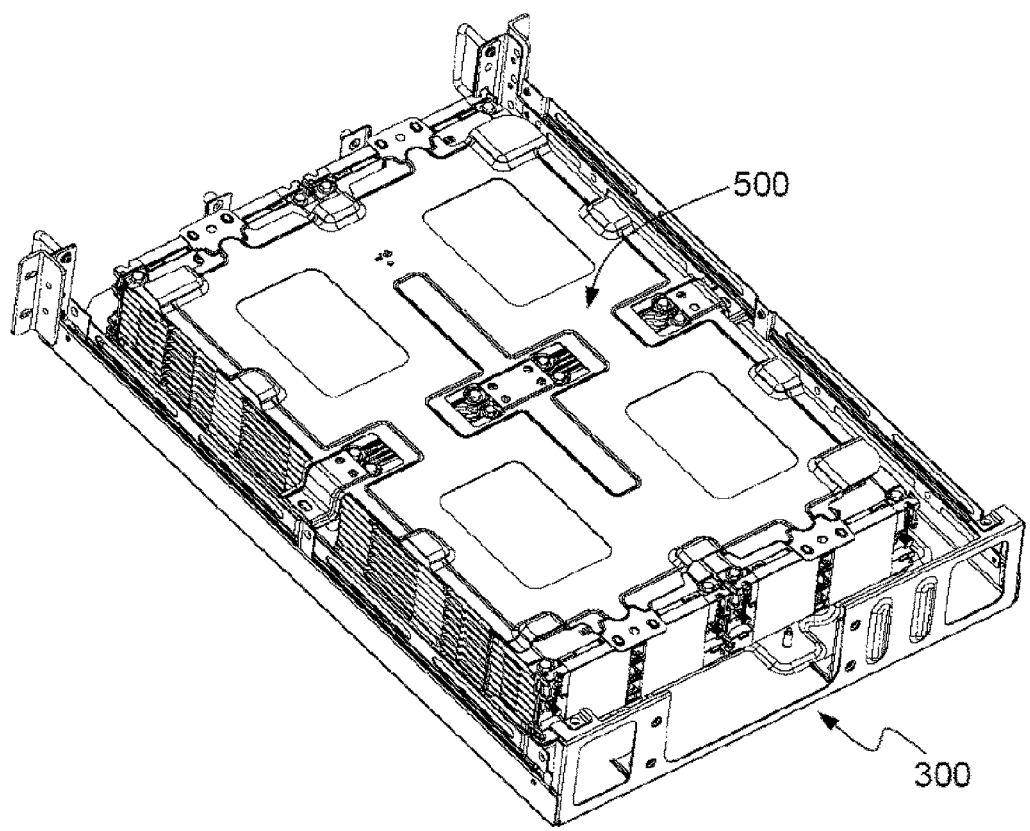
FIG. 12 is a perspective view showing that the assembly cover is mounted at the top of the battery module of FIG. 10.

FIG. 10 is a perspective view showing that battery modules 101, 102, 103, and 104 are located on the base plate 300 of FIG. 7, and FIG. 11 is a perspective view showing an assembly cover 500 according to an embodiment of the present invention. In addition, FIG. 12 is a perspective view showing that the assembly cover is mounted at the tops of the battery modules of FIG. 10.

Referring to these figures together with FIGS. 6 to 8, the battery modules 101, 102, 103, and 104 are located on the module receiving parts 301, 302, 303, and 304 of the base plate 300. The located battery modules 101, 102, 103, and 104 are fixed by the assembly cover 500.

Specifically, the assembly cover 500 is provided with fastening holes 512 and 540, through which upwardly protruding fastening parts 321 and 322 formed at the base plate 300 are inserted.

The module cover 200 is provided at the top thereof with upward protrusions 251 and 252, which are inserted through fastening holes 521 and 522 for positioning of the assembly cover 500. The fastening holes 521 and 522 for positioning enable the battery modules 101, 102, 103, and 104 to be correctly mounted at the assembly cover 500.

The battery modules 101, 102, 103, and 104 correctly mounted and fixed to the assembly cover 500 as described above are fixed again by bolting through the bushing insertion hole 220 formed at the module cover 200 and a bushing (not shown) mounted in the bushing insertion hole 220. Specifically, bolts, having inserted through the fastening holes 523 of the assembly cover 500 and the bushing insertion holes 220 of the respective module covers 200, are fixed to the upwardly protruding fastening parts 311, 312, 313, and 314 of the base plate to more securely fix the battery modules 101, 102, 103, and 104 fixed to the module covers 200.

Figure 13:
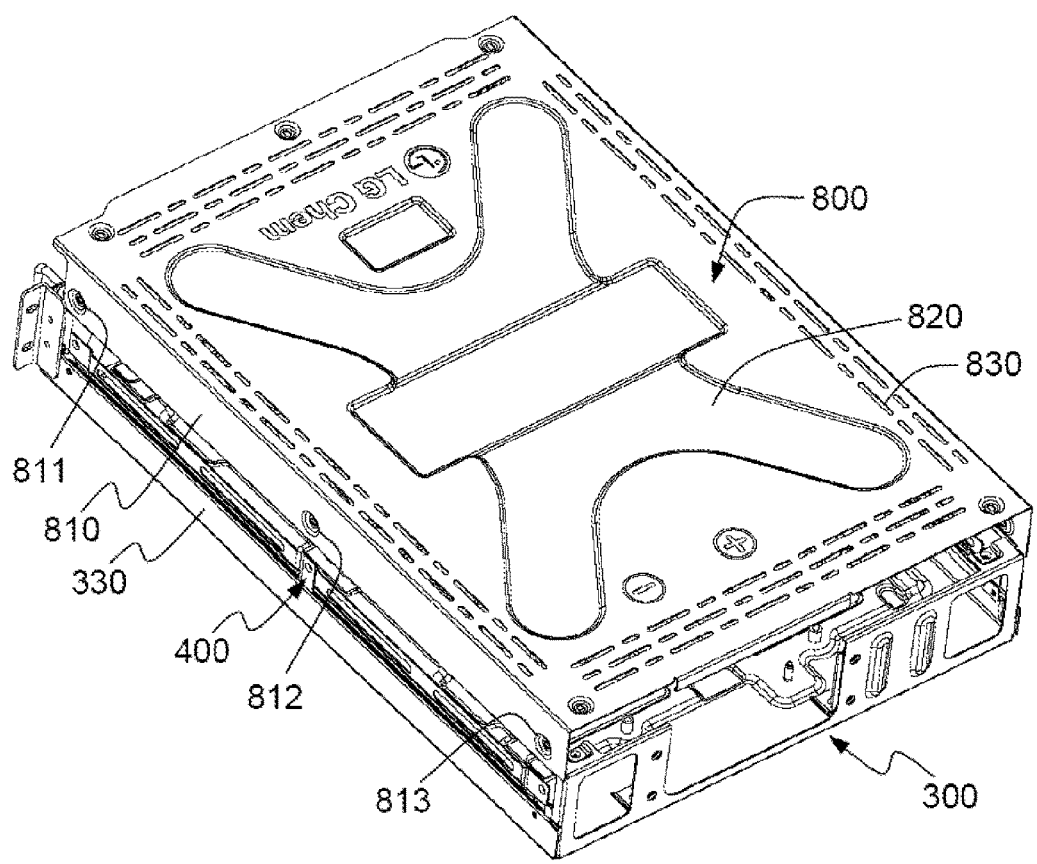
FIG. 13 is a perspective view showing that an upper cover plate is mounted at the base plate of FIG. 7.

FIG. 13 is a perspective view showing that an upper cover plate 800 is mounted at the base plate 300 of FIG. 7.

Referring to FIG. 13 together with FIGS. 8 and 9, the upper cover plate 800 is fixed on the base plate 300 to form the top of the battery module assembly. The upper cover plate 800 is provided at opposite side edges thereof with downwardly bent side walls 810, which are coupled to the base plate 300 via the brackets 400 mounted at the base plate 300.

The upper cover plate 800 is provided at the outer surface thereof with an X-shaped reinforcement bead 820 protruding toward the battery modules 101, 102, 103, and 104 for improving rigidity of the upper cover plate 800. In addition, the upper cover plate 800 is provided at an outer edge thereof with a plurality of ventilation openings 830. The ventilation openings 830 are arranged along the outer edge of the upper cover plate 800.

Meanwhile, the upper cover plate 800 includes protruding parts 811, 812, and 813 corresponding to the depressed parts 401, 402, and 403 formed at the brackets 400. The protruding parts 811, 812, and 813 include fastening holes (not shown) fastened to the fastening holes 411, 412, and 413 of the depressed parts 401, 402, and 403 by bolting.

Fastening between the upper cover plate 800 and the brackets 400 is achieved using elastic deformation of the upper cover plate 800. The upper cover plate 800 is easily correctly located at the brackets 400 due to elasticity of the upper cover plate 800, thereby more easily performing a fastening assembly process.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a base plate of a battery module assembly according to the present invention is configured to have a structure including a reinforcement bead. Consequently, it is possible to restrain the increase in volume of the battery module assembly while preventing deformation of the battery module assembly due to swelling and to improve efficiency of a production process. In addition, it is possible to assemble the battery module assembly including the base plate such that the battery module assembly has a compact structure and to stably fix members received in the battery module assembly. Furthermore, it is possible to simultaneously improve safety and efficiency of the production process.

The invention claimed is:

1. A base plate of a battery module assembly, wherein the base plate is made of a metal sheet having module receiving parts, on which one or more battery modules each comprising battery cells are loaded, formed at a top thereof, the sheet is provided at at least a portion of an outer edge thereof with upwardly bent side walls, and the module receiving parts are provided with reinforcement beads protruding toward the battery modules.

2. The base plate according to claim 1, wherein each of the battery cells is a prismatic secondary battery or a pouch-shaped secondary battery.

3. The base plate according to claim 2, wherein the pouch-shaped secondary battery is configured to have a structure in which an electrode assembly is mounted in a laminate sheet comprising a resin layer and a metal layer in a sealed state.

4. The base plate according to claim 1, wherein each of the battery modules is configured such that the battery cells are connected in parallel to each other.

5. The base plate according to claim 4, wherein the parallel connection between the battery cells is achieved using a '¬'-shaped or '['-shaped bus bar.

6. The base plate according to claim 1, wherein the battery cells are fixed to a cartridge frame, and each of the battery modules is configured to have a structure in which cartridge frames are stacked.

7. The base plate according to claim 1, wherein the sheet is a metal sheet.

8. The base plate according to claim 1, wherein two or more battery modules are loaded on the base plate, and the battery module assembly comprises a plate-shaped assembly cover loaded on tops of the battery modules and coupled to the battery modules in a fastening fashion, the assembly cover comprising a cable fixing part for fixing a cable.

9. The base plate according to claim 8, wherein the battery modules are provided with fastening holes for fastening with the assembly cover.

10. The base plate according to claim 1, wherein each of the reinforcement beads has a protruding height equivalent to 10 to 400% a thickness of the base plate.

11. The base plate according to claim 1, wherein each of the reinforcement beads comprises:
a main bead located at a center of a corresponding one of the module receiving parts for absorbing stress concentrated on the center of a corresponding one of the battery modules, the main bead being circular when viewed from above;
auxiliary beads located at corners of a corresponding one of the module receiving parts, each of the auxiliary beads having a smaller size than the main bead, each of the auxiliary beads being circular when viewed from above; and
connection beads extending from the main bead to the respective auxiliary beads.

12. The base plate according to claim 11, wherein the main bead has a radius equivalent to 1.5 to 10 times that of each of the auxiliary beads.

13. A battery module assembly comprising a base plate according to claim 1.

14. A device comprising a battery module assembly according to claim 13 as a power source.

15. The device according to claim 14, wherein the device is a power supply for emergency, a power supply for computer rooms, a portable power supply, a power supply for medical facilities, a power supply for fire extinguishing facilities, a power supply for alarm facilities, or a power supply for refuge facilities.

16. The battery module assembly according to claim 13, wherein the battery module assembly further comprises:
two or more battery modules, each of which comprises two or more plate-shaped battery cells vertically stacked such that electrode leads of the battery cells are arranged in one direction; and
an upper cover plate comprising downwardly bent side walls formed at opposite sides thereof on the basis of electrode terminals of the battery modules, the upper cover plate being fixed on the base plate to form a top of the battery module assembly.

17. The battery module assembly according to claim 16, wherein the upper cover plate is provided with a reinforcement bead protruding toward the battery modules.

18. The battery module assembly according to claim 17, wherein the reinforcement bead of the upper cover plate is formed to have an X shape when viewed from above.

19. The battery module assembly according to claim 16, wherein each of the battery modules further comprises an electrically insulative module cover mounted on the electrode leads of the battery cells and fixed to the base plate and an assembly cover in a fastening fashion.

20. The battery module assembly according to claim 19, wherein the module cover comprises:
a first hook for fixing cables connected to the electrode terminals of each of the battery modules;
an upward protrusion for positioning fixedly engaged with the assembly cover; and
a second hook mounted and fixed to each of the battery modules.

21. The battery module assembly according to claim 19, wherein the module cover further comprises a bushing insertion hole, through which the module cover is mounted and fixed to the base plate.

22. The battery module assembly according to claim 16, wherein the base plate and the upper cover plate are fixed to each other via brackets.

23. The battery module assembly according to claim 22, wherein each of the brackets has one side coupled to a corresponding side wall of the base plate in a welding fashion and the other side coupled to a corresponding one of the side walls of the upper cover plate in fastening fashion.

* * * * *